July 19, 1938.  R. STONE ET AL  2,124,016
AUTOMOBILE SIGNAL
Filed July 6, 1937
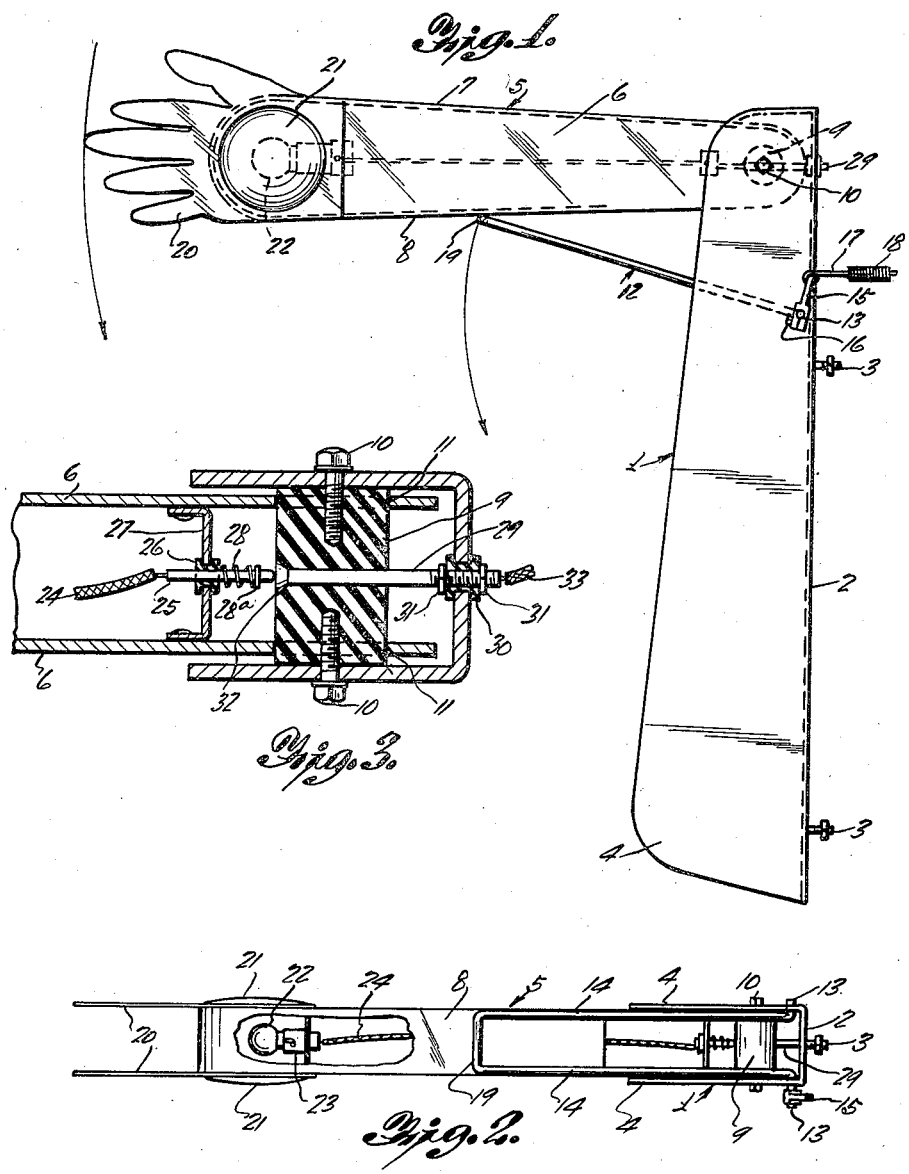
INVENTORS
ROY STONE
HARVEY JACKSON
BY Adam E. Fisher
ATTORNEY Patented July 19, 1938

2,124,016

UNITED STATES PATENT OFFICE 2,124,016

AUTOMOBILE SIGNAL

Roy Stone, International Falls, and Harvey Jackson, Holler, Minn.

Application July 6, 1937, Serial No. 152,018

1 Claim. (Cl. 116—52)

This invention relates to improvements in signals for automobiles.

The main object of the invention is to provide an arm hinged to the side of an automobile with means whereby the arm may be extended laterally to indicate the driver's intention to make a turn and without requiring that the driver put his own arm out the window for the purpose as is now done.

Another object is to provide in a signal of this kind means for automatically illuminating a warning signal lens on the arm when it is in extended position.

Another object is to provide a device of this kind in a simple and inexpensive form comprising a housing in which the arm is pivoted and in which the arm normally is concealed, a yoke for raising and swinging the arm outward and with means for operating the yoke from inside the automobile, a warning lens and lamp in the outer end of the arm and a fixed hub having a contact carried by the arm to close the circuit to the lamp when the arm is in extended position.

With these and other objects in view the invention resides in the novel construction and arrangement of parts as hereinafter fully set forth and claimed, reference being had to the accompanying drawing as showing a preferred embodiment of our invention for purposes of exemplification.

In the drawing:

Figure 1 is a rear elevation of the signal with the arm in extended position.

Figure 2 is a plan view.

Figure 3 is an enlarged section through the hub and switch assembly.

In carrying out our invention we provide an elongated housing 1 of U-shaped cross section having a back or bight 2 adapted to be secured vertically by bolts 3 to the side of an automobile preferably just forward of the left hand front door thereof. The sides 4 of the housing thus extend outwardly and preferably they increase in width gradually from their upper to their lower ends. The signal arm 5 is somewhat shorter than the housing 1 and includes the sides 6 and top and bottom 7 and 8 which form a rectangular cross section as shown. This arm is inserted by its inner end between the upper ends of the housing sides 4 and a pivotal connection is formed thereat by means of a hub 9 of insulating material secured between the sides 4 by screws 10 and pivotally fitting in apertures 11 formed in the sides of the arm. The arm 5 may thus swing freely into or out of the housing 1 and in the former position the sides 4 will conceal and protect the arm.

A U-shaped yoke 12 is provided and has pivot fingers 13 turned laterally from the ends of its arms 14, these fingers being journaled through the housing sides 4 a short distance below the hub 9 and immediately adjacent the back 2. The width of this yoke 12 is such that it may swing freely into or out of the housing 1 and normally it hangs inside the housing against the back 2 and behind the arm 5. A crank 15 is secured by a screw 16 to one finger 13 of the yoke and a wire 17 runs from the free end of this crank through the flexible tubing 18 to the interior of the automobile where the driver may grasp and operate it readily. The arrangement is such that by pulling on this wire the yoke 12 will be swung outwardly and upwardly from the housing and its bight 19 will then engage and carry the arm 5 up to a horizontal outwardly extended position so as to give a direction signal to other traffic on the road. When the pull on the wire 17 is released the weight of the parts will return them to position inside the housing. Of course, a lever (not shown) or other convenient means may be provided for so operating the device.

The sides 6 of the signal arm 5 are cut and formed to simulate the appearance of a hand at their outer ends as shown at 20. Red glass lenses 21 are then located in the sides 6 at the "palm" of the hand and inside the arm a lamp 22 is seated in a socket 23. A wire 24 leads from this socket 23 to a contact brush or pin 25 which is slidably mounted through an insulating bushing 26 in a cross piece 27 located near the hub 9 so that the pin extends radially to the hub. An expansion coil spring 28 braced between the bushing 26 and a collar 28a on the pin urges the pin toward the hub so that the inner end of the pin lightly rides the periphery of the hub as the arm 5 swings into or out of the housing 1. A contact bolt 29 is passed diametrically and horizontally through the hub 9 and inwardly through the insulating bushing 30 secured in the housing back 2 and is secured in place by nuts 31. The head 32 of the bolt 29 is enlarged and rounded to lie flush with the periphery of the hub and as the arm 5 reaches its horizontal position the pin 25 will contact this head 32. A wire 33 leads from the inner end of the bolt 29 to the battery (not shown) of the automobile and when the arm 5 reaches the horizontal position the circuit will be completed between the battery and the lamp 22 giving a signal through the lenses 21. The remaining side of the circuit is completed through ground in well known manner. When the arm 5 moves down again into the housing 1 the circuit will be automatically broken due to the pin 25 moving off the head 32 of the bolt 29.

It will be readily evident from the foregoing that a very clear and visible signal may be given even at night and without the driver putting his hand or arm outside the automobile.

The arm 5 might be arranged to stop at intermediate positions to give other signals and different colored warning lamps used by arranging several of the pins 25 and bolts 29 around and through the hub 9.

While we have herein set forth a certain preferred embodiment of our invention it is understood that we may vary from the same in minor structural details so as best to provide a practical device for the purposes intended, not departing from the spirit of the invention and within the scope of the appended claim.

We claim:

In a device of the kind described, an elongated housing U-shaped in cross section for securing vertically by bolts passed through its bight portion to the side of an automobile at the left front door, a signal arm pivotally mounted at its predetermined inner and upper end within the predetermined upper end of the housing, a U-shaped yoke having pivot fingers turned laterally out at its free ends and thereby journaled through the sides of the housing below the point of pivotal mounting of the signal arm, the yoke being arranged to swing freely into or out of the housing and to bear upwardly against the signal arm for raising same into operative position, and means for actuating the yoke for thus elevating the signal arm.

ROY STONE.
HARVEY JACKSON.